United States Patent
Yamato

(10) Patent No.: US 8,888,366 B2
(45) Date of Patent: Nov. 18, 2014

(54) HYDROSTATIC GUIDE DEVICE AND MACHINE TOOL USING THE HYDROSTATIC GUIDE DEVICE

(71) Applicant: JTEKT Corporation, Osaka (JP)

(72) Inventor: Hiroki Yamato, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/089,039

(22) Filed: Nov. 25, 2013

(65) Prior Publication Data

US 2014/0153847 A1    Jun. 5, 2014

(30) Foreign Application Priority Data

Dec. 4, 2012    (JP) .................................. 2012-265340

(51) Int. Cl.
*F16C 29/02*    (2006.01)
*F16C 32/06*    (2006.01)

(52) U.S. Cl.
CPC ........... *F16C 29/025* (2013.01); *F16C 32/0648* (2013.01)
USPC .......................................................... 384/12

(58) Field of Classification Search
USPC .......................................................... 384/12
See application file for complete search history.

(56) References Cited

U.S. PATENT DOCUMENTS

| | | | | |
|---|---|---|---|---|
| 3,466,951 A * | 9/1969 | Greenberg | ...................... | 384/12 |
| 3,583,774 A * | 6/1971 | De Gast | .......................... | 384/12 |
| 4,080,009 A * | 3/1978 | Marathe et al. | .................. | 384/12 |
| 4,378,134 A * | 3/1983 | Eddy | ............................... | 384/12 |
| 4,643,590 A * | 2/1987 | Olasz | ................................. | 384/8 |
| 4,744,675 A * | 5/1988 | Sakino et al. | ................... | 384/12 |
| 6,419,394 B1 * | 7/2002 | Kashchenevsky | .............. | 384/12 |
| 6,655,838 B2 * | 12/2003 | Perrone, Jr. | ..................... | 384/12 |
| 2013/0108192 A1 * | 5/2013 | Hashimoto | ..................... | 384/12 |

FOREIGN PATENT DOCUMENTS

JP    06-000735 A    1/1994

* cited by examiner

*Primary Examiner* — Thomas R. Hannon
(74) *Attorney, Agent, or Firm* — Oblon, Spivak, McClelland, Maier & Neustadt, L.L.P.

(57) ABSTRACT

A hydrostatic guide device includes: a fixed member having vertical guide faces; a movable member having vertical slide faces; a fluid supply device; a hydrostatic pocket to which a first fluid pressure based on a dimension of a gap is applied, and that urges the movable member with a first urging force; and a hydraulic pocket to which a second fluid pressure based on a dimension of a gap is applied, and that urges the movable member with a second urging force. A variation of the second fluid pressure is smaller than a variation of the first fluid pressure. When the first urging force and the second urging force are balanced with each other in a horizontal direction, the gap between the vertical guide face and the vertical slide face becomes a set value.

7 Claims, 6 Drawing Sheets

HYDROSTATIC GUIDE DEVICE AND MACHINE TOOL USING THE HYDROSTATIC GUIDE DEVICE

INCORPORATION BY REFERENCE/RELATED APPLICATION

This application claims priority to Japanese Patent Application No. 2012-265340 filed on Dec. 4, 2012, the disclosure of which, including the specification, drawings and abstract, is incorporated herein by reference in its entirety.

BACKGROUND OF THE INVENTION

1. Field of the Invention

The invention relates to a hydrostatic guide device and a machine tool using the hydrostatic guide device.

2. Discussion of Background

A hydrostatic guide device keeps two members in a non-contact state to reduce friction therebetween. Therefore, hydrostatic pockets, which are recesses, are formed in one of opposed faces of the two members that move relative to each other, and a fluid such as air or oil is spouted from the hydrostatic pockets to form a fluid outflow layer having a predetermined thickness between the two members. Thus, the sliding between the two members is improved and the stiffness of guidance created between guide faces is enhanced. According to a conventional technique described in, for example, Japanese Patent Application Publication No. 6-735 (JP 6-735 A), pressures that are supplied to upper and lower guide faces, right and left guide faces, and hydrostatic pockets in slide faces opposed to the guide faces are regulated by orifices (variable orifices) to improve the sliding and to enhance the stiffness of guidance created between the guide faces.

However, with the conventional technique described in JP 6-735 A, it is necessary to perform machining of the guide faces and assembly of two members with a high degree of accuracy in order to stably ensure a high degree of stiffness. This increases the machining cost and the number of man-hours needed to manufacture a hydrostatic guide device.

SUMMARY OF THE INVENTION

The invention provides a hydrostatic guide device configured such that a high degree of stiffness of guidance created between guide faces is stably ensured even if the machining accuracy and the assembling accuracy vary, and provides a machine tool using the hydrostatic guide device.

According to a feature of an example of the invention, there is provided a hydrostatic guide device including: a fixed member having a pair of vertical guide faces that face in opposite directions; a movable member having a pair of vertical slide faces that are opposed to the respective vertical guide faces; a fluid supply device; a hydrostatic pocket that is formed in one of the vertical slide faces, the one of the vertical slide faces being opposed to one of the vertical guide faces, the one of the vertical guide faces serving as a reference face, to which a fluid is supplied by the fluid supply device, to which a first fluid pressure based on a dimension of a gap between the one of the vertical guide faces and the one of the vertical slide faces is applied, and that urges the movable member toward the other of the vertical guide faces with a first urging force; and a hydraulic pocket that is formed in other one of the vertical slide faces, the other of the vertical slide faces being opposed to the other one of the vertical guide faces, to which the fluid is supplied by the fluid supply device, to which a second fluid pressure based on a dimension of a gap between the other one of the vertical guide faces and the other one of the vertical slide faces is applied, and that urges the movable member toward the one of the vertical guide faces with a second urging force, wherein a variation of the second fluid pressure with respect to a variation of the gap between the other one of the vertical guide faces and the other one of the vertical slide face is smaller than a variation of the first fluid pressure with respect to a variation of the gap between the one of the vertical guide faces and the one of the vertical slide faces, and when the first urging force and the second urging force are balanced with each other in a horizontal direction, the gap between the one of the vertical guide faces, the one of the vertical guide faces serving as the reference face, and the one of the vertical slide faces becomes a set value.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
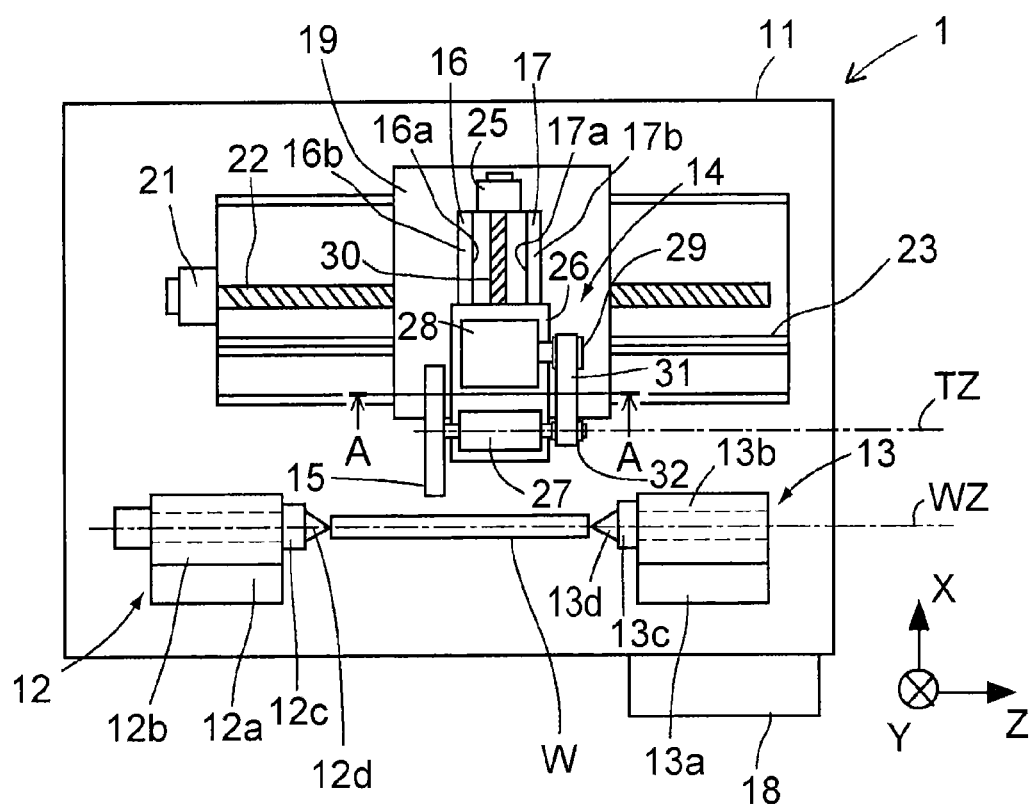
FIG. 1 is a plan view illustrating an embodiment of a grinding machine in which a hydrostatic guide device according to the invention is used.
Figure 2:
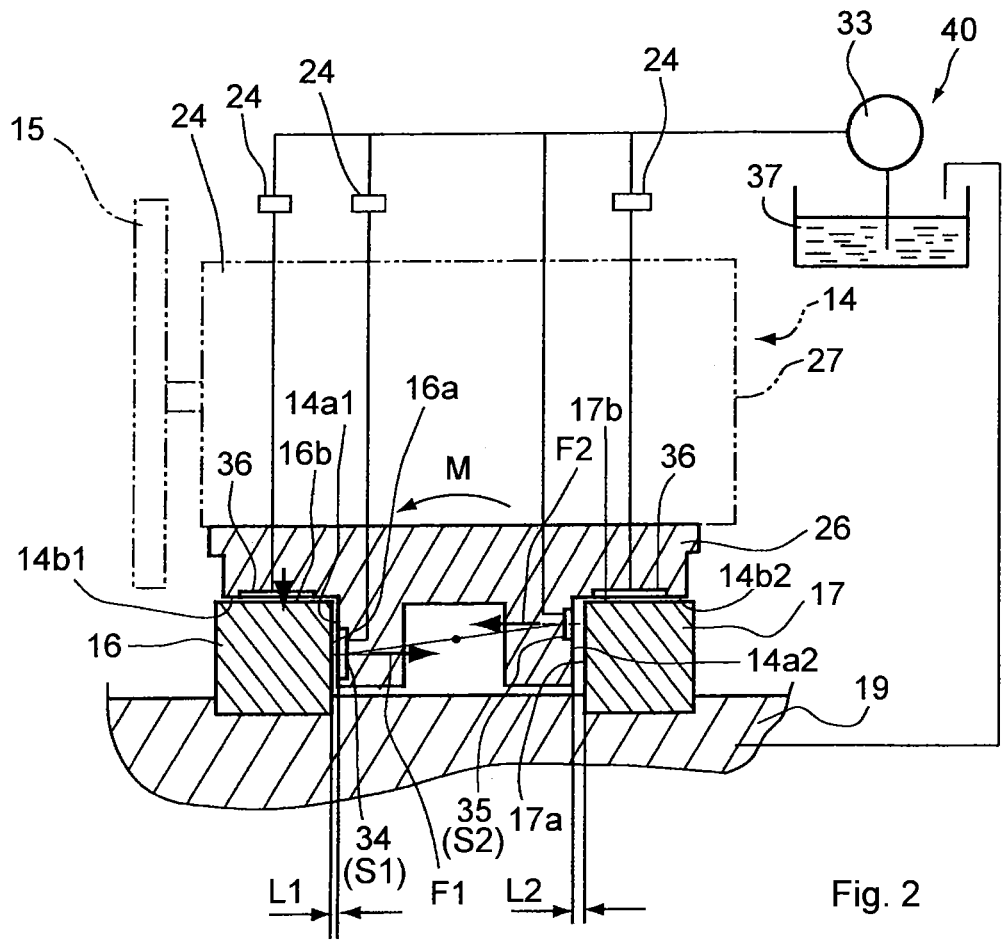
FIG. 2 is a sectional view taken along the line A-A in FIG. 1.

FIG. 1 illustrates an embodiment of a grinding machine 1 in which a hydrostatic guide device 40 according to the invention is used. The grinding machine 1 is a wheel head traverse-type grinding machine. FIG. 1 illustrates an example of a plan view of the grinding machine 1, and FIG. 2 is a sectional view taken along the line A-A in FIG. 1. In all the drawings in which an X-axis, a Y-axis, and a Z-axis are drawn, the X-axis, the Y-axis and the Z-axis are orthogonal to each other, the Y-axis indicates an upward vertical direction, and the Z-axis and the X-axis indicate horizontal directions. The Z-axis indicates a direction of axis of rotation of a workpiece, and the X-axis indicates a direction in which a grinding wheel 15 (an example of a tool according to the invention) cuts into a workpiece W (an example of a workpiece according to the invention).

As illustrated in FIG. 1, the grinding machine 1 includes a bed 11, a work head 12 that is secured to the bed 11, and that supports both ends of the workpiece W such that the workpiece W is rotatable, and a foot stock 13. Further, the grinding machine 1 includes a wheel head 14 (an example of a movable member according to the invention) that is movable in both the X-axis direction and the Z-axis direction on the bed 11, the grinding wheel 15 that is rotatably supported to the wheel head 14, the hydrostatic guide device 40 (refer to FIG. 2), and a control unit 18 that drives the work head 12 and the grinding wheel 15 and controls the position of the grinding wheel 15 with respect to the workpiece W.

In the grinding machine 1, the workpiece W that is rotating about a workpiece rotation axis WZ is ground by the grinding wheel 15. The grinding wheel 15 is formed in a disc shape. The grinding wheel 15 is rotated about a grinding wheel rotation axis TZ, and is arranged so as to be movable in both the Z-axis direction and the X-axis direction relative to the workpiece W. The workpiece rotation axis WZ and the grinding wheel rotation axis TZ are both in parallel with the Z-axis.

As illustrated in FIG. 1 and FIG. 2, the work head 12 includes a base 12a, a spindle housing 12b and a main spindle 12c. The base 12a is arranged on the bed 11. The spindle housing 12b is configured so as to be able to reciprocate in the Z-axis direction relative to the base 12a. The main spindle 12c is supported so as to be rotatable about the workpiece rotation axis WZ in the spindle housing 12b. A centering member 12d is provided at one end of the main spindle 12c. A drive motor (not illustrated) is provided for the main spindle 12c. The control unit 18 controls the rotation of the main spindle 12c about the workpiece rotation axis WZ, which passes through the distal end of the centering member 12d, to a given angle, at a given angular velocity.

The foot stock 13 includes a base 13a, a tailstock spindle housing 13b, a tailstock spindle housing 13b, and a tailstock spindle 13c. The base 13a is arranged on the bed 11. The tailstock spindle housing 13b is configured so as to be movable in the Z-axis direction relative to the base 13a. The tailstock spindle 13c is supported so as to be rotatable or non-rotatable about the workpiece rotation axis WZ in the tailstock spindle housing 13b, and is arranged so as to coaxial with the main spindle 12c. The workpiece W is supported at its both ends (or at portions near the both ends) by the work head 12 including the centering member 12d and the foot stock 13 including a centering member 13d (chucks may be used instead of the centering members).

A traverse base 19 (an example of a fixed member according to the invention) is arranged on the bed 11. The traverse base 19 is positioned, under control, at a given position in the Z-axis direction along a V-shape guide 23 in accordance with a rotation angle of a ball screw 22 that is controlled by a Z-axis drive motor 21. The control unit 18 detects a signal from position detecting means such an encoder (not illustrated) and outputs a control signal to the Z-axis drive motor 21 to position the traverse base 19 in the Z-axis direction.

The wheel head 14 (an example of a movable member according to the invention) that advances or retracts the grinding wheel 15 is arranged on the traverse base 19. The wheel head 14 is positioned, under control, at a given position in the X-axis direction, along guides 16, 17 that are provided integrally with the upper face of the traverse base 19, in accordance with a rotation angle of the ball screw 30 that is controlled by an X-axial drive motor 25. The control unit 18 detects a signal from position detecting means and outputs a control signal to the X-axial drive motor 25 to position the wheel head 14 (movable member) at a position in the X-axis direction.

As illustrated in FIG. 2, for example, the grinding wheel rotation axis TZ and the workpiece rotation axis WZ are positioned on the same horizontal plane. In this state, the grinding wheel 15 is brought closer to the workpiece W, and a machining point is set to a point on the grinding wheel 15 side, at which the grinding wheel 15 comes into contact with the workpiece W. A coolant nozzle (not illustrated) that supplies a coolant to the vicinity of the machining point is provided in the grinding machine 1. Dressing means (not illustrated) for dressing the grinding wheel 15 is attached to the spindle housing 12b in the grinding machine 1 illustrated in an example in FIG. 1 and FIG. 2.

As illustrated in FIG. 1 and FIG. 2, the wheel head (movable member) 14 includes a slide table 26, the grinding wheel 15, a grind wheel bearing 27, a grinding wheel drive motor (servo-motor) 28, the X-axial drive motor 25 and the like. The rotative power is transmitted from the grinding wheel drive motor 28 to the grinding wheel 15 via a drive pulley 29, a belt 31 and a driven pulley 32. In the present embodiment, the wheel head 14 is advanced or retracted by the grinding wheel drive motor 28 and the ball screw 30. Alternatively, a linear motor may be used. A driving mechanism that advances or retracts the wheel head 14 is not particularly limited.

As illustrated in FIG. 2, the hydrostatic guide device 40 includes the traverse base (fixed member) 19, the wheel head 14 (movable member), a hydraulic pump 33 (an example of a fluid supply device according to the invention), variable orifices 24 (an example of orifices according to the invention), a hydrostatic pocket 34 that is connected to the hydraulic pump 33 through the variable orifice 24, and a hydraulic pocket 35 that is directly connected to the hydraulic pump 33. The hydraulic pump 33 draws a fluid such as oil up from a reservoir 37 and then discharges the fluid at a pressure P (discharge pressure). The hydraulic pump 33 is controlled by the control unit 18 so as to discharge the fluid always at a constant pressure. The discharged fluid is circulated in the hydrostatic guide device 40, and is then returned into the reservoir 37 by recovery means (not illustrated).

As illustrated in FIG. 1 and FIG. 2, the traverse base 19 includes a pair of the guides 16, 17 that are mounted on the upper face of the traverse base 19 and that moves the wheel head 14 in the X-axis direction. The guides 16, 17 are separated from each other in the Z-axis direction, and are extended in the X-axis direction by an equal length. The guide 16 is arranged so as to be closer to the grinding wheel 15 (an example of a tool according to the invention) than the guide 17. As illustrated in FIG. 2, the guides 16, 17 respectively have opposed faces, that is, a pair of vertical guide faces 16a, 17a that faces in opposite directions. In the present embodiment, the vertical guide face 16a may function as one of vertical guide faces according to the invention, and serves as a reference face. The vertical guide face 17a may function as the other one of the vertical guide faces according to the invention.

A horizontal guide face 16b that is orthogonal to the vertical guide face 16a is formed on the upper face of the guide 16. A horizontal guide face 17b that is orthogonal to the vertical guide face 17a is formed on the upper face of the guide 17. In the present embodiment, the horizontal guide face 16b and the horizontal guide face 17b are formed so as to have the same height. However, the invention is not limited to this configuration. The horizontal guide face 16b and the horizontal guide face 17b may have different heights. Note that the horizontal guide face 16b and the horizontal guide face 17b are located at positions outside the vertical guide faces 16a, 17a, respectively. That is, when the middle position between the vertical guide faces 16a, 17a is set as the center, a side that is outward of the vertical guide face 16a in a direction from the center to the vertical guide face 16a and in a direction away from the vertical guide face 16a will be referred to as "outside the vertical guide face 16a". Further, a side that is outward of the vertical guide face 17a in a direction from the center to the vertical guide face 17a and in a direction away from the vertical guide face 17a will be referred to as "outside the vertical guide face 17a".

A pair of vertical slide faces 14a1, 14a2 is formed on the lower face of the slide table 26 of the wheel head 14. The vertical slide faces 14a1, 14a2 are opposed to the vertical guide faces 16a, 17a of the guides 16, 17 of the traverse base 19, when the wheel head 14 is arranged on the traverse base 19. The vertical slide face 14a1 may function as one of vertical slide faces according to the invention, and the vertical slide face 14a2 may function as the other one of the vertical slide faces according to the invention. A pair of horizontal slide faces 14b1, 14b2 that are opposed to the horizontal guide faces 16b, 17b of the guides 16, 17 are formed on the lower face of the slide table 26. Because the wheel head 14 is just arranged on the traverse base 19, only a load corresponding to the weight of the wheel head 14 is exerted on the horizontal guide faces 16b, 17b.

Figure 3:
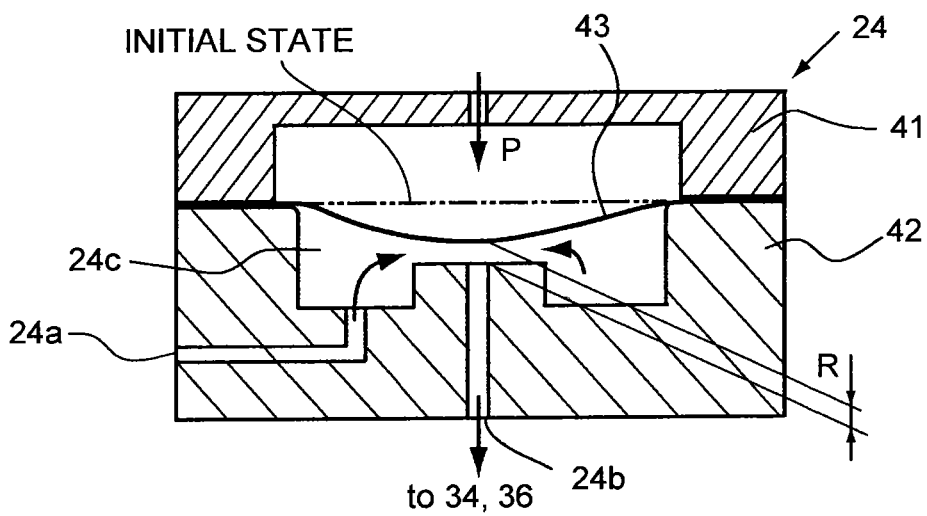
FIG. 3 is a sectional view illustrating the configuration of a variable orifice.

The hydrostatic pocket 34, which is a recess, is formed in the vertical slide face 14a1 that is opposed to the vertical guide face 16a that serves as the reference face. The hydrostatic pocket 34 is connected to the hydraulic pump 33 through the variable orifice 24 as described above. In the present embodiment, the variable orifice 24 is a variable orifice of a diaphragm type as illustrated in FIG. 3 as an example. Note that the variable orifice 24 may be a variable orifice of a spool type or may be a variable orifice of another type, instead of the variable orifice of a diaphragm type.

As illustrated in FIG. 3, the diaphragm-type variable orifice 24 includes an upper housing 41, a lower housing 42 and a diaphragm 43. The variable orifice 24 discharges a fluid that is supplied from an inlet port 24a, into the hydrostatic pocket 34 from an outlet port 24b through an annular portion R that serves as an orifice. The fluid is directly supplied to the inlet port 24a from the hydraulic pump 33. When the pressure of the fluid in the hydrostatic pocket 34 is increased, the pressure of the fluid in the outlet port 24b that is communicated with the hydrostatic pocket 34 and the pressure of the fluid in a fluid reservoir 24c are increased. Thus, the diaphragm 43 is pushed up, and accordingly, the area of the annular portion R is increased, and accordingly, the flow rate is increased.

When the pressure of the fluid in the hydrostatic pocket 34 is decreased, the pressure of the fluid in the outlet port 24b that is communicated with the hydrostatic pocket 34 and the pressure of the fluid in the fluid reservoir 24c are decreased. Thus, the diaphragm 43 is pushed down, and accordingly, the area of the annular portion R is decreased so that the flow rate is decreased. Due to such an action, when a gap L1 between the vertical guide face 16a and the vertical slide face 14a1 having the hydrostatic pocket 34 is changed, the opening area of the annular portion R in the variable orifice 24 is increased or decreased, depending upon the dimension of the gap L1, and accordingly, a first fluid pressure P1 that is supplied into the hydrostatic pocket 34 is changed. A first urging force F1 is expressed by $F1=P1 \times S1$, where S1 is an area of the hydrostatic pocket 34 that receives the first fluid pressure P1 at this time.

The hydraulic pocket 35 is formed in the vertical slide face 14a2 that is opposed to the vertical guide face 17a. As described above, the hydraulic pocket 35 is directly connected to the hydraulic pump 33. That is, the discharge pressure P of the hydraulic pump 33 is directly applied to the hydraulic pocket 35 as it is, and serves as a second fluid pressure P2. A second urging force F2 is expressed by $F2=P2$ (nearly equal to P)$\times S2$, where S2 is the area of the hydraulic pocket 35 that receives the second fluid pressure P2. In the present embodiment, S2 is set smaller than S1 (S2<S1).

The hydraulic pocket 35 is arranged such that the center position of the hydraulic pocket 35 in the vertical direction is set to be above the center position of the hydrostatic pocket 34 in the vertical direction. The center position of the hydraulic pocket 35 and the center position of the hydrostatic pocket 34 coincide with the heights of the gravitational load centers of the second urging force F2 and the first urging force F1 that are generated by the hydraulic pocket 35 and the hydrostatic pocket 34 upon reception of the second fluid pressure P2 and the first fluid pressure P1, respectively.

Horizontal hydrostatic pockets 36, 36, which are recesses, are respectively formed in the horizontal slide faces 14b1, 14b2. The horizontal hydrostatic pockets 36, 36 are connected to the hydraulic pump 33 through the variable orifices 24. In the state where the hydraulic pump 33 is not operated, the horizontal slide faces 14b1, 14b2 contact and press respectively the horizontal guide faces 16b, 17b due to the weight of the wheel head 14. When the hydraulic pump 33 is operated, the fluid is supplied into the horizontal hydrostatic pockets 36, 36 from the hydraulic pump 33 through the variable orifices 24. Then, due to the fluid pressure of the thus supplied fluid, the fluid is spouted between the horizontal guide faces 16b, 17b and the horizontal slide faces 14b1, 14b2 from the horizontal hydrostatic pockets 36, 36 to form outflow layers having a predetermined thickness. As a result, the horizontal guide faces 16b, 17b and the horizontal slide faces 14b1, 14b2 fall into a non-contact state, and accordingly, the friction therebetween is decreased. Thus, it is possible to obtain a satisfactory sliding state.

The horizontal balance of the wheel head 14 in the hydrostatic guide device 40 configured as described above will be described. In the hydrostatic guide device 40, the first fluid pressure P1 is supplied into the hydrostatic pocket 34 through the variable orifice 24, and the second fluid pressure P2 that is nearly equal to the discharge pressure P of the hydraulic pump 33 is supplied into the hydraulic pocket 35. Further, the wheel head 14 is moved in one of directions along the X-axis, and then, falls into a horizontally balanced state in which the first urging force F1 (P1×S1) is equal to the second urging force F2 (P2×S2). Thus, the following equation is satisfied; the first fluid pressure P1=the second fluid pressure P2×(S2/S1).

Figure 4:
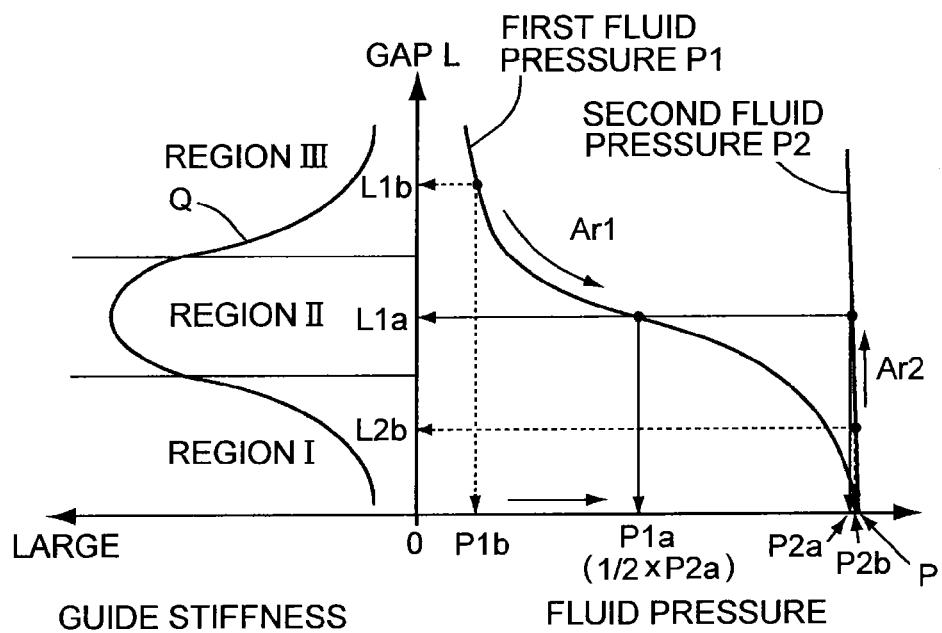
FIG. 4 is a graph illustrating the relationship between the fluid pressure and a gap in the hydrostatic guide device, and the relationship between the gap and the guidance stiffness.

The above state will be described in detail with reference to a graph illustrated in FIG. 4. The graph in FIG. 4 illustrates the characteristics of the first fluid pressure P1 and the second fluid pressure P2 in a case where a region on the right side of 0 in the abscissa axis represents the fluid pressure and the ordinate axis represents the gap L. As will be understood from the graph, the first fluid pressure P1 supplied into the hydrostatic pocket 34 greatly varies depending upon a variation in the gap L, whereas the variation in the second fluid pressure P2, which is supplied into the hydraulic pocket 35, due to a variation in the gap L is small. As described above, in the invention, the variation of the second fluid pressure P2 with respect to a variation in the gap L2 between the vertical guide face 17a and the vertical slide face 14a2 is smaller than the variation of the first fluid pressure P1 with respect to a variation in the gap L1 between the vertical guide face 16a and the vertical slide face 14a1.

In FIG. 4, a region on the left side of 0 in the abscissa axis represents the guidance stiffness T, the relationship between the gap L and the guidance stiffness T is illustrated. In the graph, the guidance stiffness T increases in the leftward direction. From a known characteristic Q that expresses the relationship between the gap L and the guidance stiffness T, it is understood that the guidance stiffness T is small when the gap L is small (region I) or when the gap L is large (region III). Therefore, in the invention, the gap L is set so as to fall in a region II where the guidance stiffness T is higher than that in the other regions. The gap L in the region II is set to, for example, L1a. Note that the characteristic Q is known, and accordingly, detailed description thereof will be omitted.

When the gap L1a is used as a set value according to the invention, the first fluid pressure P1 is P1a on the basis of the graph in FIG. 4. The first fluid pressure P1a with respect to the gap L1 a as the set value is assumed to be, for example, ½ of the second fluid pressure P2a (nearly equal to the discharge pressure P) at this time.

In the state as described above, in order to balance the first urging force F1 (=P1×S1) and the second urging force F2 (=P2×S2) with each other in the horizontal direction, the area S1 of the hydrostatic pocket 34 that generates the first urging force F1 is set to half the area S2 of the hydraulic pocket 35. Thus, the first urging force F1 is balanced with the second urging force F2 generated by the second fluid pressure P2 that is nearly equal to the discharge pressure P of the hydraulic pump 33, and accordingly, the gap L1a is obtained by the first fluid pressure P1a. At this time, the gap L2 is automatically determined on the basis of the dimensions of the slide table 26, the traverse base 19, the guides 16, 17 and the gap L1a.

In actuality, first, the discharge pressure P of the hydraulic pump 33 is determined on the basis of various constraint conditions. Next, the gap L1a for obtaining a desired stiffness is set, and the area S2 of the hydraulic pocket 35 and the area S1 of the hydrostatic pocket 34 with respect to the area S2 are determined such that the first urging force F1 and the second urging force F2 are balanced with each other at the time when the gap La is obtained. As described above, the set value is a single value that is the gap L1a. However, the invention is not limited to this, and the set value may be set within a certain range in view of a variation in the second urging force F2 based on a variation in the discharge pressure P of the hydraulic pump 33.

Next, the urging that is applied to the wheel head 14 in the vertical direction (downward) will be described. As described above, in the present embodiment, the center position of the hydraulic pocket 35 in the vertical direction is set to be above the center position of the hydrostatic pocket 34 in the vertical direction.

Thus, as illustrated in FIG. 2, a rotational moment M is generated at the wheel head 14. The thus generated rotational moment M presses the horizontal slide face 14b1 of the slide table 26 of the wheel head 14, against the horizontal guide face 16b on the vertical guide face 16a side. The vertical guide face 16a serves as the reference face. Thus, it is possible to enhance the stiffness of the guidance created between the horizontal guide face 16b on the reference face side and the horizontal slide face 14b1. Further, the wheel head 14 that is mounted on the traverse base 19 only by the weight of the wheel head 14 can be reliably held. Therefore, it is possible to restrain the reference face side of the wheel head 14 from moving up when the workpiece W is machined by the grinding wheel 15. Thus, it is possible to enhance the accuracy of machining the workpiece W.

Next, the operation will be described with reference to FIG. 4. The following description will be provided on the assumption that the set value of the gap L1 between the vertical guide face 16a serving as the reference face, and the vertical slide face 14a1 is the gap L1a, that the gap L1 between the vertical guide face 16a and the vertical slide face 14a1 is a gap L1b that is larger than the gap L1a (refer to the graph in FIG. 4) when the wheel head 14 is arranged on the traverse base 19 during the assembly of the grinding machine 1, and that the gap L2 between the vertical guide face 17a and the vertical slide face 14a2 is equal to Lb2 (refer to the graph in FIG. 4). Note that the sum of the gap L1 and the gap L2 is always a constant value (L1+L2).

In this state, the grinding machine 1 after the assembly is completed. Thus, the hydrostatic guide device 40 is also actuated, and accordingly, the fluid is discharged from the hydraulic pump 33 at the discharge pressure P. The thus discharge fluid is supplied into the hydrostatic pocket 34 and the hydraulic pocket 35. The first fluid pressure P1 based on the gap L1b is supplied into the hydrostatic pocket 34 on the reference face side, under the action of the variable orifice 24. The second fluid pressure P2 that is substantially equal to the discharge pressure P is supplied into the hydraulic pocket 35 (refer to the graph in FIG. 4). At this time, the first urging force F1 and the second urging force F2 cannot be balanced with each other unless the first fluid pressure P1 has the magnitude of ½ of the second fluid pressure P2 on the basis of the area ratio between S1 and S2(½).

Accordingly, the wheel head 14 is urged and moved by the second urging force F2 toward the vertical guide face 16a (reference face) in the Z-axis direction. Thus, as indicated by the arrow Ar1 in the graph in FIG. 4, the gap L1b is gradually decreased, and the first fluid pressure P1 eventually becomes the first fluid pressure P1a. At this time, although the second fluid pressure P2 does not significantly vary as illustrated in FIG. 4, the gap L1b is increased, and the second fluid pressure P2 becomes the second fluid pressure P2a (=P1a×2). Thus, the first urging force F1 due to the first fluid pressure P1 and the second urging force F2 due to the second fluid pressure P2 are balanced with each other, and, as a result, the gap L1 on the reference face side becomes the gap L1a that is the set value.

By actuating the grinding machine 1 in this way, the assembled state of the traverse base 19 and the wheel head 14 that are roughly assembled together is modified into a desired assembled state. Thus, the guidance stiffness of the reference face located on the grinding wheel 15 side is brought to a value that is set in advance. At this time, the rotational moment M is generated at the wheel head 14, and accordingly, the horizontal slide face 14b1 is pressed against the horizontal guide face 16b, as described above. Thus it is possible to enhance the stiffness of the guidance created between the horizontal guide face 16b on the reference face side and the horizontal slide face 14b1.

In the present embodiment, the horizontal hydrostatic pockets 36, 36 are formed in the horizontal slide faces 14b1, 14b2 of the wheel head 14. However, the horizontal hydrostatic pockets 36, 36 may be omitted, and instead, there may be used a slide-type guide in which the horizontal slide faces 14b1, 14b2 and the horizontal guide faces 16b, 17b are brought into contact with each other and slid relative to each other. With this configuration as well, advantageous effects similar to those obtained by the above-described embodiment can be obtained.

Figure 5:
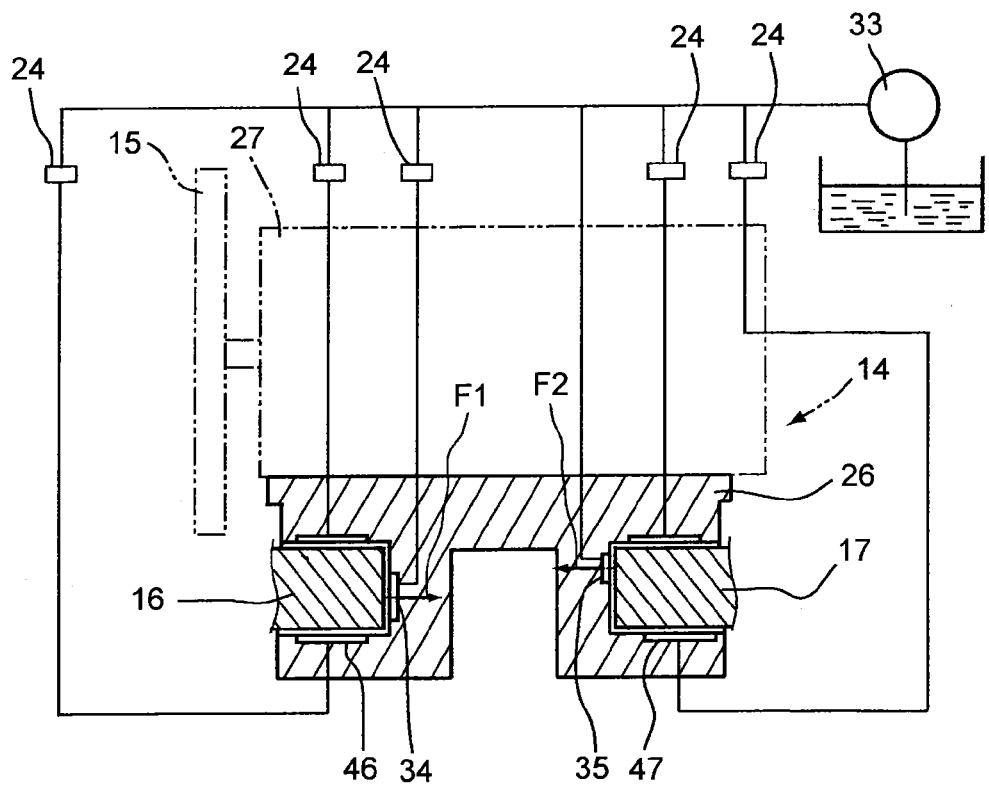
FIG. 5 is a view illustrating a first modified example.

In a first modified example, as illustrated in FIG. 5, the guides 16, 17 may be supported from below via hydrostatic pockets 46, 47. With this configuration as well, advantageous effects similar to those obtained by the above-described embodiment can be obtained.

In the above-described embodiment, the tool is arranged on the movable member, and the tool is the grinding wheel 15 of the wheel head 14. However, the invention is not limited to this configuration, and a workpiece may be arranged on the movable member. In this case, the workpiece may be arranged closer to the reference face side than the vertical guide face 17a. With this configuration as well, a satisfactory degree of accuracy of machining the workpiece can be obtained.

In the hydrostatic guide device 40 according to the embodiment of the invention, the gap L1 between the vertical guide face 16a serving as the reference face and the vertical slide face 14a1 can be brought to a value within a predetermined range when the first urging force F1 and the second urging force F2 are balanced with each other in the horizontal direction. Accordingly, even if a variation in the gap L1 between the reference face (vertical guide face 16a) and the vertical slide face 14a1 occurs during the assembly of the hydrostatic guide device 40, the gap L1 between reference face (vertical guide face 16a) and the vertical slide face 14a1 can be brought into a value within a desired range by actuating the hydrostatic guide device 40. Thus, it is possible to obtain a satisfactory guidance stiffness. Further, because the assembly can be roughly made, the man-hours required for the assembly can be reduced.

In the present embodiment, the area S1 of the hydrostatic pocket 34 is set to be larger than the area S2 of the hydraulic pocket 35. Therefore, in the state in which the wheel head 14 (movable member) is moved in the Z-axis direction and the first urging force F1 and the second urging force F2 are balanced with each other, the first fluid pressure P1 may be set to a value smaller than the second fluid pressure P2 on the basis of the area ratio. Accordingly, by appropriately setting the area ratio between the area S1 of the hydrostatic pocket 34 and the area S2 of the hydraulic pocket 35, the first fluid pressure P1 can be set to a value at which the fluid can be easily supplied. Thus, it is possible to obtain the gap L1 having a desired value at which a high degree the guidance stiffness is obtained.

In the present embodiment, the fluid having the discharge pressure P is directly supplied as the fluid having the second fluid pressure P2 into the hydraulic pocket 35 from the hydraulic pump 33 (fluid supply device). Thus, it is not necessary to regulate the second fluid pressure P2, and accordingly, the control is simplified. Because the second fluid pressure P2 is a constant pressure, the discharge pressure P from the hydraulic pump 33 can be decreased just by providing the variable orifice 24 that has a simple structure in the supply passage from the hydraulic pump 33. Thus, it is possible to easily obtain the first fluid pressure P1 based on the area ratio (S2/S1).

In the present embodiment, the vertical center position of the hydrostatic pocket 34 that is opposed to the vertical guide face 16a serving as the reference face, is located below the vertical center position of the hydraulic pocket 35. Thus, when the first fluid pressure P1 and the second fluid pressure P2 are supplied respectively into the hydrostatic pocket 34 and the hydraulic pocket 35, the rotational moment M is created at the wheel head 14. The thus created rotational moment M presses the horizontal slide face 14b1 of the wheel head 14 on the reference face side against the horizontal guide face 16b that is opposed to the horizontal slide face 14b1. Thus, it is possible to enhance the stiffness of the guidance created between the horizontal guide face 16b on the reference face side and the horizontal slide face 14b1. When the hydrostatic guide device 40 is applied to the grinding machine 1, the wheel head 14 (movable member) arranged on the traverse base 19 (fixed member) only by its weight, can be firmly held on the traverse base 19. Thus, it is possible to restrain the wheel head 14 from moving up from the traverse base 19 due to a reaction force that is exerted by the workpiece W and that is created at the machining point when the grinding wheel 15 grinds the workpiece W after the wheel head 14 is advanced in the X-axis direction.

In the present embodiment, because the hydrostatic guide device 40 according to the invention is applied to the grinding machine 1 (an example of a machine tool according to the invention), the possibility that the machining point of the grinding wheel 15 that is provided to the wheel head 14 (movable member) on the reference face side, is low. Thus it is possible to provide the grinding machine 1 capable of machining a workpiece with a high degree of accuracy.

In the present embodiment, the hydraulic pocket 35 is arranged such that the vertical center position of the hydraulic pocket 35 is located above the vertical center position of the hydrostatic pocket 34 in order to create the rotational moment M. However, the invention is not limited to this configuration, and the vertical center position of the hydraulic pocket 35 and the vertical center position of the hydrostatic pocket 34 may be located at the same level of height. With this configuration as well, it is possible to obtain the effect that the position of the wheel head 14 is modified in the Z-axis direction (horizontal direction).

Figure 6:
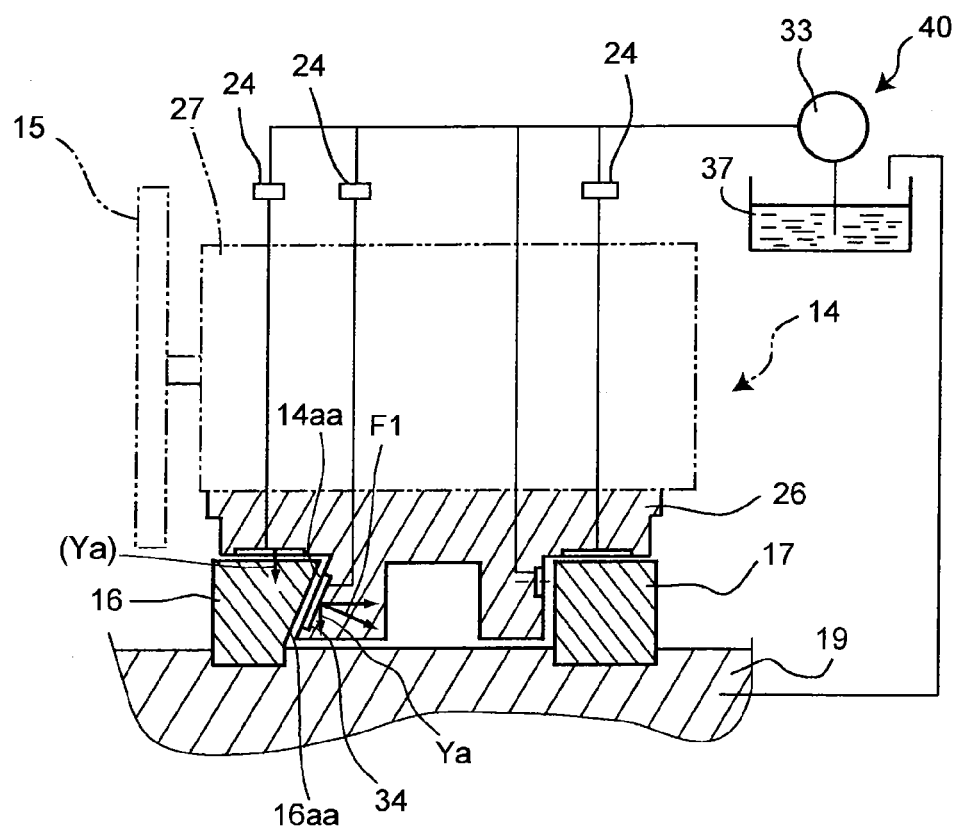
FIG. 6 is a view illustrating a second modified example.

Next, a second modified example will be described with reference to FIG. 6. In the second modified example, as illustrated in FIG. 6, a vertical guide face 16aa serving as the reference face is formed so as to be tilted so that the wheel head 14 is urged downward by a force component Ya of the first urging force F1. Further, a vertical slide face 14aa opposed to the vertical guide face 16aa is tilted so as to correspond to the vertical guide face 16aa.

Thus, the horizontal slide face 14b1 of the wheel head 14 (movable member) that is mounted on the traverse base 19 only by its weight is pressed onto the horizontal guide face 16b opposed to the horizontal slide face 14b1 in order to enhance the vertical guidance stiffness T on the reference face side. Thus, it is possible to restrain the wheel head 14 on the reference face side from moving up.

Figure 7:
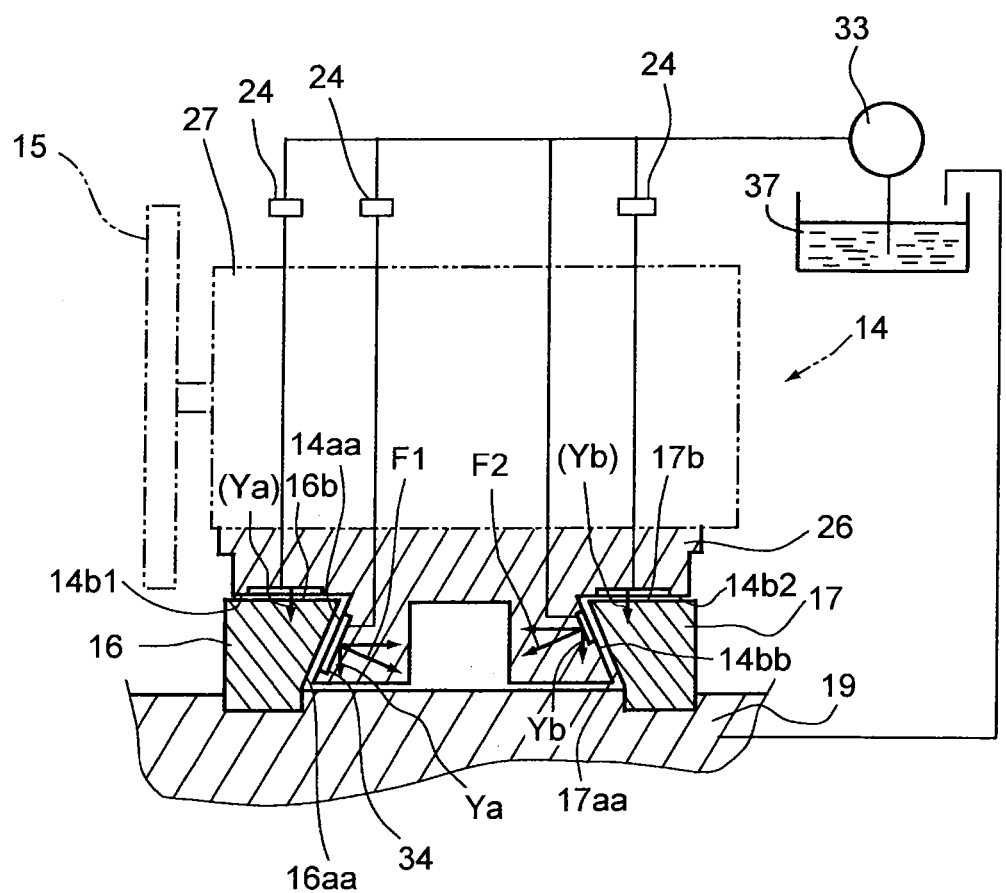
FIG. 7 is a view illustrating a third modified example.

Next, a third modified example will be described with reference to FIG. 7. The third modified example differs from the first modified example in that, a vertical guide face 17aa is formed so as to be tilted so that the wheel head 14 is urged downward by the force component Yb of the second urging force F2 in addition to the force component Ya of the first urging force F1. Further, the vertical slide face 14bb opposed to the vertical guide face 17aa is formed so as to be tilted so as to correspond to the vertical guide face 17aa. Thus, in the wheel head 14, the horizontal slide faces 14b1, 14b2 are pressed against the horizontal guide faces 16b, 17b. As a result, it is possible to enhance the guidance stiffness T, thereby restraining the wheel head 14 from moving up.

Figure 8:
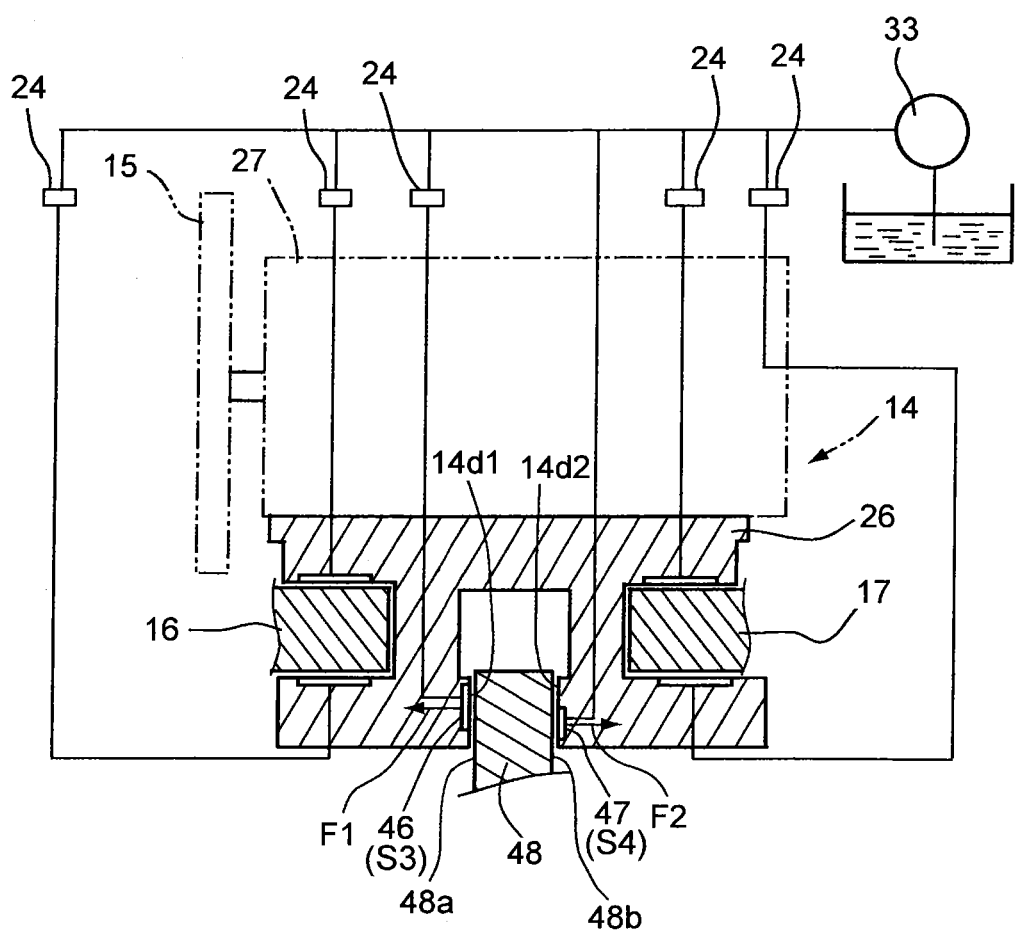
FIG. 8 is a view illustrating a fourth modified example.

Next, a fourth modified example will be described with reference FIG. 8. The fourth modified example differs from the third modified example in that a guide 48 is additionally provided. The guide 48 is secured onto the traverse base 19. As illustrated in FIG. 8, the guide 48 has vertical guide faces 48a, 48b formed on its left and right side. The slide table 26 of the wheel head 14 (movable member) has vertical slide faces 14d1, 14d2 that are formed respectively on the faces that are opposed to the vertical guide faces 48a, 48b. A hydrostatic pocket 46 having an area S3 is formed in the vertical slide face 14d1, and a hydraulic pocket 47 having an area S4 is formed in the vertical slide face 14d2. The hydrostatic pocket 46 is connected to the hydraulic pump 33 through the variable office 24. The hydraulic pocket 47 is connected directly to the hydraulic pump 33.

When the first fluid pressure P1 is supplied into the hydrostatic pocket 46, the first urging force F1 is generated toward the grinding wheel 15 so as to urge the wheel head 14 (movable member). Further, when the second fluid pressure P2 that is substantially equal to the discharge pressure P of the hydraulic pump 33, is supplied into the hydraulic pocket 47, the second urging force F2 is generated in a direction opposed to the first urging force F1 to urge the wheel head 14 (movable member). The fourth modified example has the same configuration and the same operation as those of the above-described embodiment, except the configuration as stated just above.

With the fourth modified example as well, advantageous effects similar to those obtained by the above-described embodiment can be obtained.

In the above-described embodiment, the area S1 (S3) of the hydrostatic pocket 34, 46 and the area S2 (S4) of the hydraulic pocket 35, 47 are set such that the following relationship is satisfied; S1 (S3)>S2 (S4). However, the invention is not limited to this configuration, and the area S1 (S3) and the area S2 (S4) may be set such that the following relationship is satisfied, S1 (S3)=S2 (S4). In this case, a regulator is interposed between the hydraulic pocket 35, 47 and the hydraulic pump 33 to control the second fluid pressure P2 that is supplied into the hydraulic pocket 35, 47 such that the second fluid pressure P2 is equal to the first fluid pressure P2. With this configuration as well, advantageous effects similar to those obtained by the above-described embodiment can be obtained.

In the above-described embodiment, the variable orifice 24 is provided between the hydrostatic pocket 34 and the hydraulic pump 33. However, the invention is not limited to this configuration. Instead of the variable orifice 24, a fixed orifice may be used. With this configuration as well, advantageous effects similar to those obtained by the above-described embodiment can be expected.

In the above-described embodiment, the hydrostatic guide device 40 is applied to the grinding machine. However, the invention is not limited to this, and the hydrostatic guide device 40 may be applied to any machine tools other than a grinding machine. The hydrostatic guide device 40 may be applied to, for example, a lathe turning machine, a milling machine, a drilling machine, a machining center or the like, and a movable member, which supports a tool for the machine tool or a workpiece in a cantilever-like manner, may be supported on a fixed member via the hydrostatic guide device 40. In this case, on the movable member, the tool or the workpiece may be arranged on the reference face side. Thus, the assembly of the movable member can be performed within a short time. Further, the workpiece can be machined with a high degree of accuracy by operating the machine tool.

What is claimed is:

1. A hydrostatic guide device comprising:
   a fixed member having a pair of vertical guide faces that face in opposite directions;
   a movable member having a pair of vertical slide faces that are opposed to the respective vertical guide faces;
   a fluid supply device;
   a hydrostatic pocket that is formed in one of the vertical slide faces, the one of the vertical slide faces being opposed to one of the vertical guide faces, the one of the vertical guide faces serving as a reference face, to which a fluid is supplied by the fluid supply device, to which a first fluid pressure based on a dimension of a gap between the one of the vertical guide faces and the one of the vertical slide faces is applied, and that urges the movable member toward the other of the vertical guide faces with a first urging force; and
   a hydraulic pocket that is formed in other one of the vertical slide faces, the other of the vertical slide faces being opposed to the other one of the vertical guide faces, to which the fluid is supplied by the fluid supply device, to which a second fluid pressure based on a dimension of a gap between the other one of the vertical guide faces and the other one of the vertical slide faces is applied, and that urges the movable member toward the one of the vertical guide faces with a second urging force, wherein
   a variation of the second fluid pressure with respect to a variation of the gap between the other one of the vertical guide faces and the other one of the vertical slide face is smaller than a variation of the first fluid pressure with respect to a variation of the gap between the one of the vertical guide faces and the one of the vertical slide faces, and
   when the first urging force and the second urging force are balanced with each other in a horizontal direction, the gap between the one of the vertical guide faces, the one of the vertical guide faces serving as the reference face, and the one of the vertical slide faces becomes a set value.

2. The hydrostatic guide device according to claim 1, wherein:
   an area of the hydrostatic pocket that receives the first fluid pressure is set larger than an area of the hydraulic pocket that receives the second fluid pressure; and
   the first fluid pressure is set smaller than the second fluid pressure, based on a ratio between the area of the hydrostatic pocket and the area of the hydraulic pocket.

3. The hydrostatic guide device according to claim 2, wherein:
   the second fluid pressure is a discharge pressure of the fluid supply device; and
   the first fluid pressure is a fluid pressure supplied through an orifice provided on a supply passage from the fluid supply device to the hydrostatic pocket.

4. The hydrostatic guide device according to claim 1, wherein:
   the fixed member has a pair of horizontal guide faces outside the vertical guide faces;
   the movable member has a pair of horizontal slide faces that are opposed to the respective horizontal guide faces; and
   a vertical center position of the hydrostatic pocket is set lower than a vertical center position of the hydraulic pocket.

5. The hydrostatic guide device according to claim 1, wherein:
   the fixed member has a pair of horizontal guide faces outside the vertical guide faces;
   the movable member has a pair of horizontal slide faces that are opposed to the respective horizontal guide faces; and
   the one of the vertical guide faces and the vertical slide face opposed to the one of the vertical guide faces are formed so as to be inclined so that the movable member is urged downward by a force component of the first urging force.

6. The hydrostatic guide device according to claim 5, wherein the other one of the vertical guide faces and the vertical slide face opposed to the other one of the vertical guide faces are formed so as to be inclined so that the movable member is urged downward by a force component of the second urging force.

7. A machine tool including a tool for machining a workpiece, comprising the hydrostatic guide device according to claim 1,
   wherein the tool or the workpiece is mounted on the movable member, at a position closer to the reference face than the other one of the vertical guide faces.

* * * * *